United States Patent
Matsushita

(10) Patent No.: US 10,128,043 B2
(45) Date of Patent: Nov. 13, 2018

(54) CHIP-TYPE ELECTRONIC COMPONENT

(71) Applicant: Murata Manufacturing Co., Ltd., Kyoto (JP)

(72) Inventor: Yosuke Matsushita, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 20 days.

(21) Appl. No.: 15/281,251

(22) Filed: Sep. 30, 2016

(65) Prior Publication Data

US 2017/0018356 A1 Jan. 19, 2017

Related U.S. Application Data

(63) Continuation of application No. PCT/JP2015/057999, filed on Mar. 18, 2015.

(30) Foreign Application Priority Data

Apr. 2, 2014 (JP) ................................. 2014-076309

(51) Int. Cl.
*H01G 2/06* (2006.01)
*H01G 4/30* (2006.01)
(Continued)

(52) U.S. Cl.
CPC ............... *H01G 2/065* (2013.01); *H01G 2/10* (2013.01); *H01G 4/005* (2013.01); *H01G 4/12* (2013.01); *H01G 4/232* (2013.01); *H01G 4/30* (2013.01)

(58) Field of Classification Search
None
See application file for complete search history.

(56) References Cited

U.S. PATENT DOCUMENTS 5,583,738 A 12/1996 Kohno et al.
2004/0240146 A1 12/2004 Kayatani et al.
(Continued)

FOREIGN PATENT DOCUMENTS

CN 1574129 A 2/2005
JP 55-075139 U1 5/1980
(Continued)

OTHER PUBLICATIONS

International Search Report issued in Japanese Patent Application No. PCT/JP2015/057999 dated Jun. 2, 2015.
(Continued)

*Primary Examiner* — Dion R Ferguson
(74) *Attorney, Agent, or Firm* — Pearne & Gordon LLP

(57) ABSTRACT

A chip-type electronic component 1a mounted on a board includes a chip element assembly 2 having an upper surface, a lower surface, and a side surface; inner electrodes 3a, 3b, and 3c formed inside the chip element assembly 2; and a cover layer 5 that is formed with an insulation material having a lower permittivity than the chip element assembly 2 and is so provided as to cover at least part of the side surface of the chip element assembly 2. With this structure, unnecessary stray capacitance between the inner electrodes 3a, 3b, and 3c formed inside the chip element assembly 2 and other electrode members arranged outside the cover layer 5 in a direction orthogonal to a thickness direction of the chip element assembly 2 can be reduced, whereby the chip-type electronic component 1a capable of realizing the desired characteristics can be provided.

18 Claims, 3 Drawing Sheets

(51) Int. Cl.
*H01G 2/10* (2006.01)
*H01G 4/232* (2006.01)
*H01G 4/005* (2006.01)
*H01G 4/12* (2006.01)

(56) References Cited

U.S. PATENT DOCUMENTS

| | | |
|---|---|---|
| 2013/0020913 A1 | 1/2013 | Shirakawa et al. |
| 2013/0057112 A1 | 3/2013 | Shirakawa et al. |
| 2013/0162372 A1 | 6/2013 | Sasaki et al. |
| 2014/0301012 A1* | 10/2014 | Kim .................. H01G 4/30 |
| | | 361/301.4 |

FOREIGN PATENT DOCUMENTS

| | | |
|---|---|---|
| JP | H06-314635 A | 11/1994 |
| JP | H09-320887 A | 12/1997 |
| JP | 2002-203735 A | 7/2002 |
| JP | 2004-214643 A | 7/2004 |
| JP | 2005-012167 A | 1/2005 |
| JP | 2010-027730 A | 2/2010 |
| JP | 2013-026392 A | 2/2013 |
| JP | 2013-058558 A | 3/2013 |
| JP | 2013-134999 A | 7/2013 |
| JP | 2013-197503 A | 9/2013 |

OTHER PUBLICATIONS

Written Opinion issued in Japanese Patent Application No. PCT/JP2015/057999 dated Jun. 2, 2015.
Japanese Office Action for Application No. 2016-511522, dated Jun. 12, 2018.

* cited by examiner

CHIP-TYPE ELECTRONIC COMPONENT

This is a continuation of International Application No. PCT/JP2015/057999 filed on Mar. 18, 2015 which claims priority from Japanese Patent Application No. 2014-076309 filed on Apr. 2, 2014. The contents of these applications are incorporated herein by reference in their entireties.

FIELD OF THE DISCLOSURE

The present disclosure relates to chip-type electronic components each having an electrode formed inside a chip element assembly which is formed with dielectric material.

DESCRIPTION OF THE RELATED ART

Chip-type electronic components in which ceramic layers formed with different materials are laminated have been well-known. For example, as shown in FIG. 6, in a chip-type electronic component 100 disclosed in Patent Document 1, a chip element assembly 101 is formed in a laminated structure in which a high permittivity ceramic layer 101a having a relatively high permittivity and low permittivity ceramic layers 101b having a relatively low permittivity are laminated. In this case, the high permittivity ceramic layer 101a is sandwiched between the low permittivity ceramic layers 101b arranged on upper and lower sides thereof, and inner electrodes 102 are formed in both the boundaries between the high permittivity ceramic layer 101a and the upper-side low permittivity ceramic layer 101b and the boundaries between the high permittivity ceramic layer 101a and the lower-side low permittivity ceramic layer 101b. Further, the inner electrodes 102 are respectively connected to outer electrodes 103 formed on side surfaces of the chip element assembly 101.

In the chip-type electronic component 100 having the above-described structure, since the upper-side and lower-side inner electrodes 102 are arranged as opposed to each other through the high permittivity ceramic layer 101a interposed therebetween, a capacitor can be constituted. In the case where a capacitor is constituted with the chip-type electronic component 100, desired capacitance may be set between the high permittivity ceramic layer 101a and the upper-side and lower-side inner electrodes 102. However, there is a case where stray capacitance is generated between the inner electrodes 102 and other electrode members different from the upper-side and lower-side inner electrodes 102. Because it is difficult to obtain desired capacitance in such a case, the generation of unnecessary stray capacitance between the inner electrodes and the other electrode members should be prevented.

In the chip-type electronic component 100 according to a known technique, the low permittivity ceramic layers 101b are arranged respectively on upper and lower sides of the capacitor portion constituted by the high permittivity ceramic layer 101a and the upper-side and lower-side inner electrodes 102. Because of this, unnecessary stray capacitance between the inner electrodes 102 and wiring electrodes of a wiring board positioned immediately under the chip-type electronic component 100 when the chip-type electronic component 100 is mounted on the wiring board, or between the inner electrodes 102 and other inner electrodes formed inside the low permittivity ceramic layers 101b can be reduced, for example.

Patent Document 1: Japanese Unexamined Patent Application Publication No. 2013-134999 (see paragraph [0076], FIG. 6, and so on).

BRIEF SUMMARY OF THE DISCLOSURE

In the chip-type electronic component 100 of the known technique as described above, unnecessary stray capacitance between the inner electrodes 102 and other electrode members arranged on upper and lower sides of the inner electrodes 102, that is, unnecessary stray capacitance between the inner electrodes 102 and the other electrode members in a thickness direction of the chip-type electronic component 100 can be reduced. However, it is difficult to prevent the generation of unnecessary stray capacitance between the inner electrodes 102 and other electrode members disposed in a direction orthogonal to the above-mentioned thickness direction.

The present disclosure has been conceived in light of the above issue, and an object thereof is to provide a chip-type electronic component including an inner electrode, which is capable of realizing the desired characteristics by reducing stray capacitance between the inner electrode and another electrode member disposed in a direction orthogonal to a thickness direction of the stated chip-type electronic component.

In order to accomplish the above object, a chip-type electronic component according to the present disclosure is a chip-type electronic component that is mounted on a board and includes a chip element assembly having an upper surface, a lower surface, and a side surface, an inner electrode formed inside the chip element assembly, and a cover layer that is formed with an insulation material having a lower permittivity than the chip element assembly and is so provided as to cover at least a part of the side surface of the chip element assembly.

In this case, the cover layer formed with an insulation material having a lower permittivity than the chip element assembly is so provided as to cover at least a part of the side surface of the chip element assembly that is orthogonal to a thickness direction of the chip element assembly. Accordingly, in a direction orthogonal to the thickness direction of the chip element assembly, unnecessary stray capacitance between the inner electrode formed inside the chip element assembly and another electrode member arranged in an outer side portion relative to the cover layer can be reduced, thereby making it possible to provide a chip-type electronic component capable of realizing the desired characteristics.

A plurality of first side-surface electrodes formed on the side surface of the chip element assembly may be provided, and at least a part of each of the plurality of first side-surface electrodes may be covered with the cover layer. In this case, in the direction orthogonal to the thickness direction of the chip element assembly, unnecessary capacitance between the inner electrode formed inside the chip element assembly as well as the first side-surface electrodes and other electrode members arranged in an outer side portion relative to the cover layer can be reduced. In addition, because at least a part of each of the first side-surface electrodes is covered with the cover layer, stray capacitance between the first side-surface electrodes adjacent to each other can be reduced even if the first side-surface electrodes are arranged at a small pitch, thereby making it possible to suppress the generation of unnecessary stray capacitance.

Further, each of the plurality of first side-surface electrodes may have an extended section that is exposed from the cover layer and is so formed as to extend from the side surface of the chip element assembly onto the lower surface of the chip element assembly. In the case where a chip-type electronic component is mounted on a board, a mounting area larger than an area of the chip-type electronic component in a plan view needs to be secured on the board side if an outer electrode of the chip-type electronic component is formed with a side surface electrode that is formed on a side surface of the chip element assembly. This makes it difficult to miniaturize the board. As such, an LGA (land grid array) structure in which an outer electrode of a chip-type electronic component is formed on a lower surface of the chip element assembly may be employed. However, because a via conductor is generally used to connect the inner electrode and the outer electrode, the degree of freedom in design of the inner electrode or the like of the chip element assembly is restricted by a degree in accordance with the formation of the via conductor inside the chip element assembly.

As such, by forming an extended section in each of the first side-surface electrodes so that the extended section extends from the side surface of the chip element assembly onto the lower surface thereof and making the extended section be exposed from the cover layer, an LGA structure in which the extended section of each of the first side-surface electrodes of the chip-type electronic component is used as the outer electrode can be realized. Accordingly, the degree of freedom in design of the inner electrode or the like of the chip element assembly can be secured while reducing unnecessary stray capacitance between the inner electrode formed inside the chip element assembly as well as the first side-surface electrodes and other electrode members arranged in an outer side portion relative to the cover layer in a direction orthogonal to the thickness direction of the chip-type electronic component, whereby improvement in the characteristics of the chip-type electronic component can be realized.

A second side-surface electrode formed on the side surface of the chip element assembly may be provided, and at least a part of the second side-surface electrode may be formed on the cover layer. In this case, because the cover layer having a lower permittivity than the chip element assembly is interposed between a portion of the second side-surface electrode formed on the cover layer and the inner electrode formed inside the chip element assembly, unnecessary stray capacitance generated between the inner electrode and the second side-surface electrode can be reduced.

An end portion of the inner electrode may be so formed as to reach a boundary between the chip element assembly and the cover layer in a portion of the side surface of the chip element assembly that is covered with the cover layer. In the case where the end portion of the inner electrode is exposed from the side surface of the chip element assembly, because there is a risk that the stated end portion short-circuits with an electrode formed on the side surface of the chip element assembly, a conductive member provided outside the chip element assembly, or the like, it is typical to set a gap, which is defined taking a variation in the processing into consideration, between the stated end portion and the side surface of the chip element assembly at the time of forming the inner electrode. This raises a problem that a design space inside the chip electrode assembly becomes smaller by an amount in accordance with the set gap.

However, in the present disclosure, because the cover layer formed with an insulation material is provided on the side surface of the chip element assembly, even if an end portion of the inner electrode is so formed as to reach the boundary between the chip element assembly and the cover layer in a portion of the side surface of the chip element assembly that is covered with the cover layer, the stated end portion can be prevented from short-circuiting with an electrode (for example, the second side-surface electrode) formed on the side surface of the chip element assembly, a conductive member of the exterior, or the like. Thus, it is unnecessary to set the above-mentioned gap at the time of forming the inner electrode, and a design space inside the chip element assembly can be widened.

In the case where the end portion of the inner electrode is so formed as to reach the boundary between the chip element assembly and the cover layer, because a distance between the second side-surface electrode formed on the cover layer and the inner electrode becomes short, it can be thought of that the stray capacitance between the second side-surface electrode and the inner electrode becomes large. However, because the cover layer is formed with a material having a lower permittivity than the chip element assembly, unnecessary stray capacitance generated between the inner electrode and the second side-surface electrode can be reduced.

Further, the cover layer may be so formed as to cover at least one of the upper surface and the lower surface, in addition to the side surface, of the chip element assembly. In this case, it is possible to reduce the unnecessary stray capacitance generated between the inner electrode and a conductive member such as another electrode or the like that is arranged on at least one side of the upper surface and the lower surface of the chip element assembly, which is covered with the cover layer.

The cover layer may be so provided as to cover corners which are boundary portions between the side surface and the upper surface of the chip element assembly and between the side surface and the lower surface of the chip element assembly. With this, since the corners of the chip element assembly to which an impact from the exterior is likely to be applied is protected by the cover layer, the chip-type electronic component can be prevented from being broken by the impact applied from the exterior.

According to the present disclosure, a cover layer formed with an insulation material having a lower permittivity than a chip element assembly is so provided as to cover at least a part of a side surface of the chip element assembly that is orthogonal to a thickness direction of the chip element assembly. With this, in a direction orthogonal to the thickness direction of the chip element assembly, unnecessary stray capacitance between an inner electrode formed inside the chip element assembly and another electrode member arranged in an outer side portion relative to the cover layer can be reduced, thereby making it possible to provide a chip-type electronic component capable of realizing the desired characteristics.

DETAILED DESCRIPTION OF THE DISCLOSURE

First Embodiment

Figure 1:
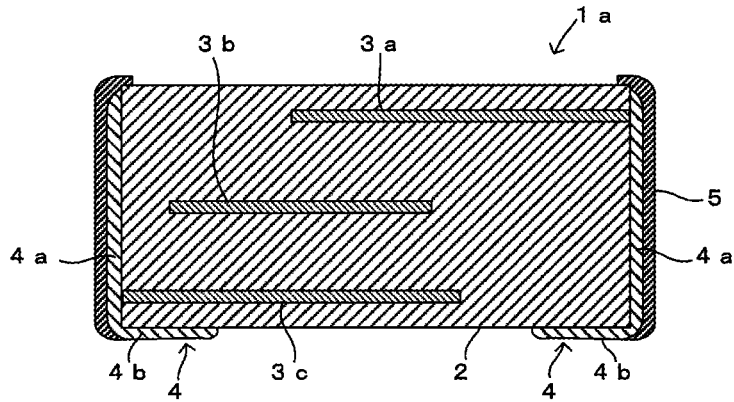
FIG. 1 is a cross-sectional view of a chip-type electronic component according to a first embodiment of the present disclosure.
Figure 2:
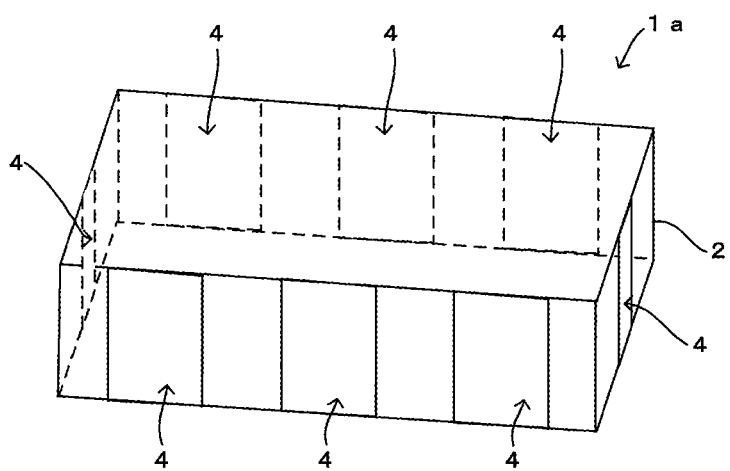
FIG. 2 is a perspective view of the chip-type electronic component in FIG. 1.

A chip-type electronic component 1a according to a first embodiment of the present disclosure will be described with reference to FIGS. 1 and 2. FIG. 1 is a cross-sectional view of the chip-type electronic component 1a, and FIG. 2 is a perspective view of the chip-type electronic component 1a. Note that in FIG. 2, a cover layer 5 is not illustrated.

The chip-type electronic component 1a according to the present embodiment includes, as shown in FIG. 1, a chip element assembly 2 having an upper surface, a lower surface, and a side surface; a plurality of inner electrodes 3a, 3b, and 3c formed inside the chip element assembly 2; a plurality of side surface electrodes 4 (each of which corresponds to "first side-surface electrode" of the present disclosure) formed on the side surface of the chip element assembly 2; and a cover layer 5 that is so provided as to cover the side surface of the chip element assembly 2 on which the side surface electrodes 4 are formed. This chip-type electronic component 1a is, for example, a chip capacitor, a chip inductor, an LC chip component in which a capacitor and an inductor are built, or the like, and is mounted on a board or the like.

The chip element assembly 2 is, for example, constituted of a multilayer body in which a plurality of ceramic layers formed with ceramic material such as low temperature co-fired ceramic or the like are laminated, and inner electrodes 3a, 3b, and 3c are formed on respective main surfaces of predetermined ceramic layers. In this case, the inner electrodes 3a, 3b, and 3c can be respectively formed by a printing technique or the like using a conductive paste containing a metal such as Cu, Ag, or the like. Inside the chip element assembly 2, a via conductor for connecting predetermined inner electrodes formed on the different layers to each other is formed in some cases. Further, some electrodes, that is, the inner electrodes 3a and 3c are connected to the side surface electrodes 4 formed on the side surface of the chip element assembly 2.

Each of the side surface electrodes 4 is made of a metal such as Cu, Ag, or the like, and is formed on the side surface of the chip element assembly 2 as shown in FIG. 2. In this case, as shown in FIG. 1, each of the side surface electrodes 4 has a side surface section 4a formed on the side surface of the chip element assembly 2 and an extended section 4b that is so formed as to extend from the side surface of the chip element assembly 2 onto the lower surface of the chip element assembly 2, and each extended section 4b is so provided as to be exposed from the cover layer 5. Then, the extended section 4b of each of the side surface electrodes 4 provided on the lower surface of the chip element assembly 2 is connected to an external board by soldering or the like. In order to enhance the connectivity with the board, Au plating, nickel plating and tin plating, or the like may be carried out on a surface of each of the side surface electrodes 4. In addition, a part of each of the side surface electrodes 4 may be so formed as to extend onto the upper surface of the chip element assembly 2 as well, like in the case of the extended section 4b.

The cover layer 5 is formed with a ceramic material having a lower permittivity than the ceramic layers constituting the chip element assembly 2, and is provided to cover the overall side surface of the chip element assembly 2 and the corners as the boundary portions between the side surface and the upper surface of the chip element assembly 2 and between the side surface and the lower surface of the chip element assembly 2 in the present embodiment. Accordingly, each of the side surface electrodes 4 has a structure in which the side surface section 4a is covered, excluding the extended portion 4b, with the cover layer 5. The cover layer 5 can be applied to the side surface of the chip element assembly 2 by dipping or the like, for example. A material for forming the cover layer 5 can be appropriately changed as long as it is an insulation material having a lower permittivity than the chip element assembly 2 (for example, ceramic, resin, or the like having low permittivity).

It is not absolutely necessary for the cover layer 5 to cover the overall side surface of the chip element assembly 2, and it is sufficient for the cover layer 5 to cover at least the side surface section 4a of each of the side surface electrodes 4. Moreover, the cover layer 5 may be so configured as to further cover, in addition to the side surface of the chip element assembly 2, at least one of a portion of the upper surface of the chip element assembly 2 and a portion of the lower surface of the chip element assembly 2 where no electrode is formed. In this case, it is possible to reduce such unnecessary stray capacitance that is generated between the inner electrodes 3a, 3b, 3c and a conductive member such as another electrode or the like arranged on at least one side of the upper surface and the lower surface of the chip element assembly 2 covered with the cover layer 5. The cover layer 5 may cover the overall four side surfaces of the chip element assembly 2.

As such, according to the above-discussed embodiment, because the cover layer 5 formed with an insulation material having a lower permittivity than the chip element assembly 2 is so provided as to cover the side surface of the chip element assembly 2, it is possible to provide the chip-type electronic element 1a in which unnecessary stray capacitance between the inner electrodes 3a, 3d, 3c and other electrode members arranged in an outer side portion relative to the cover layer 5 in a direction orthogonal to the thickness direction of the chip element assembly 2 is reduced.

Because the side surface section 4a of each of the side surface electrodes 4 is covered with the cover layer 5, unnecessary stray capacitance between the side surface electrodes 4 and other electrode members arranged in an outer side portion relative to the cover layer 5 in a direction orthogonal to the thickness direction of the chip element assembly 2 can be reduced. In addition, because each of the side surface electrodes 4 is covered with the cover layer 5, even if the side surface electrodes 4 are arranged at a small pitch, stray capacitance between the side surface electrodes adjacent to each other can also be reduced, and the desired characteristics can be realized by reducing the unnecessary stray capacitance.

In the case where the chip-type electrode component 1a is mounted on a board, a mounting area larger than an area of the chip-type electronic component 1a in a plan view needs to be secured on the board side if outer electrodes of the chip-type electronic component 1a are formed with the side surface electrodes 4 that are formed on the side surface of the chip element assembly 2. This makes it difficult to miniaturize the board. As such, an LGA (land grid array) structure in which the outer electrodes of the chip-type electronic component 1a are formed on the lower surface of the chip element assembly 2 may be employed. However, because via conductors are typically used to connect the inner electrodes 3a, 3b, 3c and the outer electrodes, the degree of freedom in design of the inner electrodes 3a, 3b, and 3c, or the like in the chip element assembly 2 is restricted by a degree in accordance with the formation of the via conductors inside the chip element assembly 2.

As such, by forming the extended section 4b in each of the side surface electrodes 4 so that the extended section 4b extends from the side surface of the chip element assembly 2 onto the lower surface thereof and making the extended section 4b be exposed from the cover layer 5, an LGA structure in which the extended section 4b of each of the side surface electrodes 4 of the chip-type electronic component 1a is used as the outer electrode can be realized. Therefore, the degree of freedom in design of the inner electrodes 3a, 3b, and 3c, or the like in the chip element assembly 2 can be secured while, in the direction orthogonal to the thickness direction of the chip-type electronic component 1a, reducing unnecessary stray capacitance between the inner electrodes 3a, 3b, 3c formed inside the chip element assembly 2 as well as the side surface electrodes 4 and other electrode members or the like arranged in an outer side portion relative to the cover layer 5.

Further, by the cover layer 5 covering the corners of the chip element assembly 2, the corners of the chip element assembly 2 to which an impact from the exterior is likely to be applied are protected by the cover layer 5. This makes it possible to prevent the chip-type electronic component 1a from being broken by the impact applied from the exterior.

Second Embodiment

A chip-type electronic component 1b according to a second embodiment of the present disclosure will be described with reference to FIG. 3. Note that FIG. 3 is a cross-sectional view of the chip-type electronic component 1b.

Figure 3:
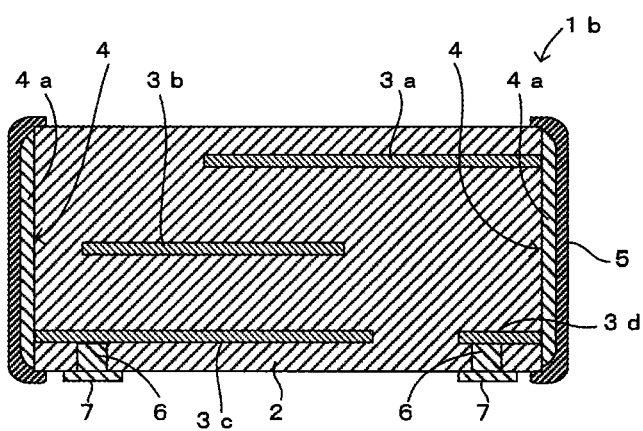
FIG. 3 is a cross-sectional view of a chip-type electronic component according to a second embodiment of the present disclosure.

The chip-type electronic component 1b according to the present embodiment differs from the chip-type electronic component 1a of the first embodiment having been discussed with reference to FIGS. 1 and 2 in a point that each of the side surface electrodes 4 does not have the extended section 4b, but only has the side surface section 4a, as shown in FIG. 3. Because other constituent elements are the same as those of the chip-type electronic component 1a of the first embodiment, the same reference signs are assigned thereto and description thereof is omitted.

In this case, in place of the extended sections 4b of the side surface electrodes 4, a plurality of land electrodes 7 for outer connection are formed on the lower surface of the chip element assembly 2. Then, the inner electrodes 3c arranged on the lower side of the drawing is connected to a predetermined land electrode 7 through an interlayer connection conductor 6 such as a via conductor or the like, and the inner electrode 3a arranged on the upper side of the drawing is connected to another predetermined land electrode 7 through the side surface electrode 4 on the right side of the drawing, an inner electrode 3d connected to a lower side of the side surface 4, and another interlayer connection conductor 6.

Also, in this case, because the side surface of the chip element assembly 2 is covered with the cover layer 5, unnecessary stray capacitance between the inner electrodes 3a, 3b, 3c, 3d and other electrode members of the exterior can be reduced in a direction orthogonal to the thickness direction of the chip element assembly 2, as in the first embodiment. In addition, using the side surface electrode 4 (the right side of the drawing) for connecting the land electrode 7 and the inner electrode 3a arranged on the upper side of the drawing makes it unnecessary to form an interlayer connection conductor (which passes through the interior of the chip element assembly 2) in a space between the inner electrode 3a and the inner electrode 3d, thereby increasing the degree of freedom in design of the inner electrodes 3a, 3b, 3c, and 3d, or the like formed inside the chip element assembly 2. In addition, the characteristics of the chip-type electronic component 1b can be improved.

Third Embodiment

A chip-type electronic component 1c according to a third embodiment of the present disclosure will be described with reference to FIG. 4. Note that FIG. 4 is a cross-sectional view of the chip-type electronic component 1c.

Figure 4:
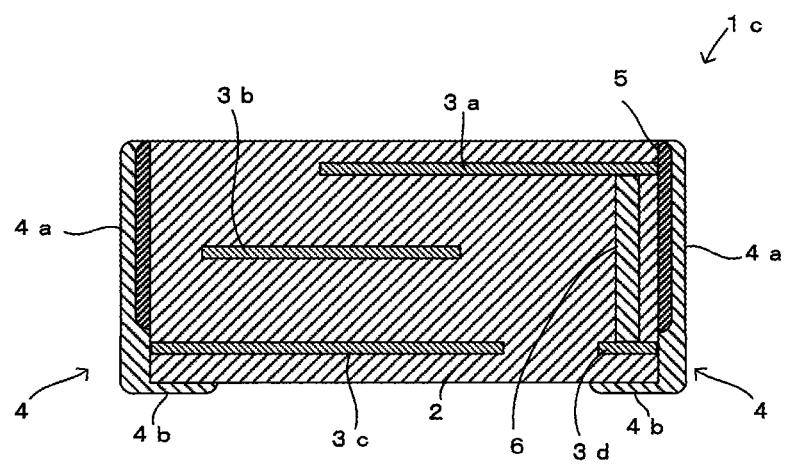
FIG. 4 is a cross-sectional view of a chip-type electronic component according to a third embodiment of the present disclosure.

The chip-type electronic component 1c according to the present embodiment differs from the chip-type electronic component 1a of the first embodiment having been discussed with reference to FIGS. 1 and 2 in a point that a part of each of the side surface electrodes 4 (corresponds to "second side-surface electrode" of the present disclosure) is formed on the cover layer 5 covering the side surface of the chip element assembly 2, as shown in FIG. 4. Because other constituent elements are the same as those of the chip-type electronic component 1a of the first embodiment, the same reference signs are assigned thereto and description thereof is omitted.

In this case, the cover layer 5 is formed by covering a portion of the side surface of the chip element assembly 2 excluding a lower portion of the side surface thereof with a ceramic paste having a lower permittivity than the chip element assembly 2, and thereafter the side surface electrodes 4 are formed. Here, the inner electrode 3a arranged on the upper side of the drawing and the inner electrode 3d connected to a lower portion of the side surface electrode 4 (the right side of the drawing) are connected to each other through the interlayer connection conductor 6.

With this configuration, because the cover layer 5 having a lower permittivity than the chip element assembly 2 is interposed between respective portions of the side surface electrodes 4 formed on the cover layer 5 and the inner electrodes 3a and 3b formed inside the chip element assembly 2, unnecessary stray capacitance generated between the inner electrodes 3a, 3b and the side surface electrodes 4 can be reduced. Thus, reducing the unnecessary stray capacitance makes it possible to realize the desired characteristics in the chip-type electronic component 1c.

The cover layer 5 may cover the overall side surface of the chip element assembly 2. In this case, it is sufficient that the side surface electrodes 4 are so formed as to extend from the side surface of the chip element assembly 2 onto the upper surface thereof and the above extended portions are connected to the predetermined inner electrodes 3a, 3b, and 3c through interlayer connection conductors or the like, for example. Further, the predetermined inner electrodes 3a, 3b, 3c and the extended portions 4b of the side surface electrodes 4 may be configured to be connected to each other using interlayer connection conductors. Moreover, the cover layer 5 may cover the boundary portions (corners) between the side surface and the upper surface of the chip element assembly 2.

Fourth Embodiment

A chip-type electronic component 1d according to a fourth embodiment of the present disclosure will be described with reference to FIG. 5. Note that FIG. 5 is a cross-sectional view of the chip-type electronic component 1d.

Figure 5:
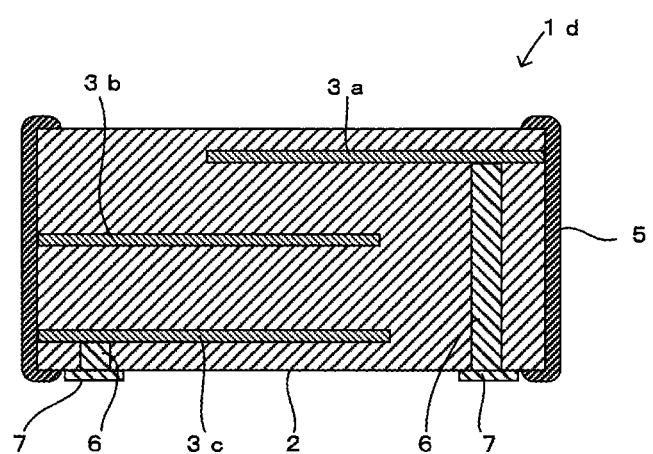
FIG. 5 is a cross-sectional view of a chip-type electronic component according to a fourth embodiment of the present disclosure.
Figure 6:
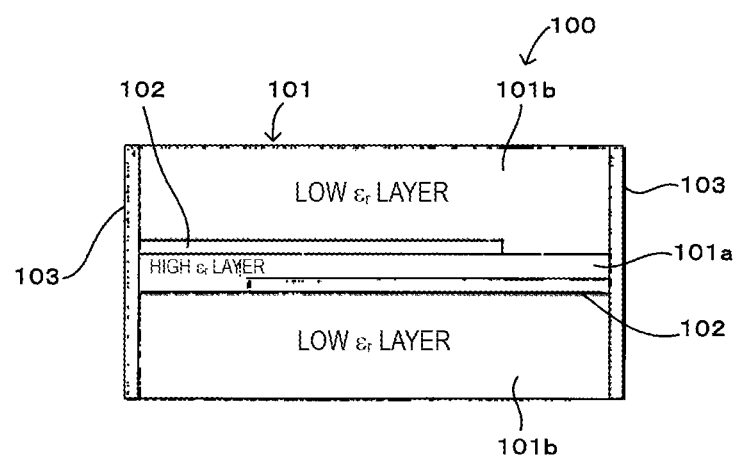
FIG. 6 is a cross-sectional view of a chip-type electronic component according to a known technique.

The chip-type electronic component 1d of the present embodiment differs from the chip-type electronic component 1b of the second embodiment having been discussed with reference to FIG. 3 in a point that, as shown in FIG. 5, the side surface electrodes 4 are not provided and an end portion of the inner electrode 3b is so formed as to reach a boundary between the chip element assembly 2 and the cover layer 5 in a portion of the chip element assembly 2 being covered with the cover layer 5. Because other constituent elements are the same as those of the chip-type electronic component 1b of the second embodiment, the same reference signs are assigned thereto and description thereof is omitted.

In the case where an end portion of the inner electrode 3b is exposed from the side surface of the chip element assembly 2, because there is a risk that the stated end portion short-circuits with a conductive member or the like outside the chip element assembly 2, it is typical to set a gap between the end portion and the chip element assembly 2 taking a variation in the processing into consideration at the time of forming the inner electrode 3b. Due to this, a design space inside the chip element assembly 2 becomes smaller by an amount in accordance with the set gap, or in the case where the chip-type electronic component 1d is constituted as a chip capacitor, for example, it is difficult to have large capacitance in the limited chip size.

However, in the chip-type electronic component 1d according to the present embodiment, because the cover layer 5 formed with an insulation material is provided on the side surface of the chip element assembly 2, even if an end portion of the inner electrode 3b is so formed as to reach the boundary between the chip element assembly 2 and the cover layer 5 in a portion of the side surface of the chip element assembly 2 being covered with the cover layer 5, the stated end portion can be prevented from being short-circuited with a conductive member or the like of the exterior. Accordingly, setting the above-mentioned gap is unnecessary at the time of forming the inner electrode 3b, thereby making it possible to widen the design space inside the chip element assembly 2. Further, by removing the gap between the end portion of the inner electrode 3b and the side surface of the chip element assembly 2, in the case where the chip-type electronic component 1d is constituted as a chip capacitor, for example, the stated chip-type electronic component 1d can have large capacitance because the inner electrode 3b with a larger area can be formed.

Note that in the above-described chip-type electronic component 1c of the third embodiment as well, an end portion of the inner electrode 3b may be so formed as to reach a boundary between the chip element assembly 2 and the cover layer 5 in a portion of the side surface of the chip element assembly 2 being covered with the cover layer 5. In this case, even if the stated end portion of the inner electrode 3b reaches the side surface of the chip element assembly 2, the cover layer 5 is interposed between the inner electrode 3b and the side surface electrode 4, whereby the inner electrode 3b and the side surface electrode 4 can be prevented from being short-circuited. As such, in the case where the chip-type electronic component 1c is constituted as a chip capacitor, the chip-type electronic component 1c is allowed to have larger capacitance by forming the inner electrode 3b with a larger area.

In the chip-type electronic component 1c of the third embodiment, in the case where an end portion of the inner electrode 3b is so formed as to reach the boundary between the chip element assembly 2 and the cover layer 5, a distance between the side surface electrode 4 formed on the cover layer 5 and the inner electrode 3b becomes short, and therefore it can be thought of that the stray capacitance therebetween becomes large. However, because the cover layer 5 is formed with a material having a lower permittivity than the chip element assembly 2, unnecessary stray capacitance generated between the inner electrode 3b and the side surface electrode 4 can be reduced.

The present disclosure is not intended to be limited to the above-discussed embodiments, and various modifications can be carried out, in addition to the above embodiments, without departing from the spirit of the disclosure. For example, in the above embodiments, in the case where the cover layer 5 covers the upper or lower surface of the chip element assembly 2, in addition to the side surface thereof, a portion of the cover layer 5 covering the side surface of the chip element assembly 2 and a portion of the cover layer 5 covering the upper or lower surface thereof may be formed with the same material or different materials.

The present disclosure can be applied to various kinds of chip-type electronic components including an inner electrode.

1a, 1b, 1c, 1d CHIP-TYPE ELECTRONIC COMPONENT
2 CHIP ELEMENT ASSEMBLY
3a, 3b, 3c, 3d INNER ELECTRODE
4 SIDE SURFACE ELECTRODE (FIRST SIDE-SURFACE ELECTRODE, SECOND SIDE-SURFACE ELECTRODE)
4b EXTENDED SECTION
5 COVER LAYER

The invention claimed is:

1. A chip-type electronic component adapted for being mounted on a board, comprising:
   a chip element assembly having an upper surface, a lower surface, and a side surface;
   an inner electrode located inside the chip element assembly; and
   a cover layer comprising an insulation material having a lower permittivity than the chip element assembly,
   wherein the cover layer is positioned to cover at least a part of the side surface of the chip element assembly, and to expose at least a part of the upper surface and the lower surface of the chip element assembly, said part of the upper surface and the lower surface of the chip element assembly being surrounded by an edge region between the upper surface and the side surface, and between the lower surface and the side surface of the chip element assembly, respectively.

2. The chip-type electronic component according to claim 1, further comprising:
   a plurality of first side-surface electrodes located on the side surface of the chip element assembly,
   wherein at least a part of each of the plurality of first side-surface electrodes is covered with the cover layer.

3. The chip-type electronic component according to claim 2,
   wherein each of the plurality of first side-surface electrodes further includes an extended section exposed from the cover layer and positioned to extend from the side surface of the chip element assembly onto the lower surface of the chip element assembly.

4. The chip-type electronic component according to claim 1, further comprising:
   a second side-surface electrode located on the side surface of the chip element assembly,
   wherein at least a part of the second side-surface electrode is located on the cover layer.

5. The chip-type electronic component according to claim 1,
   wherein an end portion of the inner electrode is positioned to reach a boundary between the chip element assembly and the cover layer in a portion of the side surface of the chip element assembly covered with the cover layer.

6. The chip-type electronic component according to claim 1,
   wherein the cover layer is so provided as to cover corner boundary portions between the side surface and the upper surface of the chip element assembly and between the side surface and the lower surface of the chip element assembly.

7. The chip-type electronic component according to claim 2,
   wherein an end portion of the inner electrode is positioned to reach a boundary between the chip element assembly and the cover layer in a portion of the side surface of the chip element assembly covered with the cover layer.

8. The chip-type electronic component according to claim 3,
   wherein an end portion of the inner electrode is positioned to reach a boundary between the chip element assembly and the cover layer in a portion of the side surface of the chip element assembly covered with the cover layer.

9. The chip-type electronic component according to claim 4,
   wherein an end portion of the inner electrode is positioned to reach a boundary between the chip element assembly and the cover layer in a portion of the side surface of the chip element assembly covered with the cover layer.

10. The chip-type electronic component according to claim 2, wherein the cover layer is positioned to partially cover at least one of the upper surface and the lower surface of the chip element assembly, in addition to the side surface of the chip element assembly.

11. The chip-type electronic component according to claim 3, wherein the cover layer is positioned to partially cover at least one of the upper surface and the lower surface of the chip element assembly, in addition to the side surface of the chip element assembly.

12. The chip-type electronic component according to claim 4, wherein the cover layer is positioned to partially cover at least one of the upper surface and the lower surface of the chip element assembly, in addition to the side surface of the chip element assembly.

13. The chip-type electronic component according to claim 5, wherein the cover layer is positioned to partially cover at least one of the upper surface and the lower surface of the chip element assembly, in addition to the side surface of the chip element assembly.

14. The chip-type electronic component according to claim 2,
   wherein the cover layer is so provided as to cover corner boundary portions between the side surface and the upper surface of the chip element assembly and between the side surface and the lower surface of the chip element assembly.

15. The chip-type electronic component according to claim 3,
   wherein the cover layer is so provided as to cover corner boundary portions between the side surface and the upper surface of the chip element assembly and between the side surface and the lower surface of the chip element assembly.

16. The chip-type electronic component according to claim 4,
   wherein the cover layer is so provided as to cover corner boundary portions between the side surface and the upper surface of the chip element assembly and between the side surface and the lower surface of the chip element assembly.

17. The chip-type electronic component according to claim 5,
   wherein the cover layer is so provided as to cover corner boundary portions between the side surface and the upper surface of the chip element assembly and between the side surface and the lower surface of the chip element assembly.

18. The chip-type electronic component according to claim 1,
   wherein the cover layer is so provided as to cover corner boundary portions between the side surface and the upper surface of the chip element assembly and between the side surface and the lower surface of the chip element assembly.

\* \* \* \* \*